United States Patent
Sundaresan et al.

(10) Patent No.: US 6,539,376 B1
(45) Date of Patent: Mar. 25, 2003

(54) SYSTEM AND METHOD FOR THE AUTOMATIC MINING OF NEW RELATIONSHIPS

(75) Inventors: Neelakantan Sundaresan, San Jose, CA (US); Jeonghee Yi, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/440,626

(22) Filed: Nov. 15, 1999

(51) Int. Cl.⁷ .............................. G06F 17/30; G06F 7/00
(52) U.S. Cl. .................................. 707/5; 707/10; 704/9
(58) Field of Search ........................ 707/1–5, 10; 704/9

(56) References Cited

U.S. PATENT DOCUMENTS

| | | | |
|---|---|---|---|
| 5,386,556 A | * 1/1995 | Hedin et al. ................ | 707/4 |
| 5,418,948 A | * 5/1995 | Turtle ......................... | 707/4 |
| 5,745,360 A | 4/1998 | Leone et al. ................ | 364/140 |
| 5,794,050 A | * 8/1998 | Dahlgren et al. .......... | 717/144 |
| 5,799,268 A | * 8/1998 | Boguraev .................... | 704/9 |
| 5,819,260 A | 10/1998 | Lu et al. ...................... | 707/3 |
| 5,857,179 A | 1/1999 | Vaithyanathan et al. .... | 707/2 |
| 6,076,088 A | * 6/2000 | Paik et al. ................... | 707/5 |
| 6,182,066 B1 | * 1/2001 | Marques ...................... | 707/5 |
| 6,185,550 B1 | * 2/2001 | Snow et al. ................. | 707/1 |

(List continued on next page.)

OTHER PUBLICATIONS

Paik, W. "Chronological Information Extraction System (CIES)", Syracuse University, undated, 5 pages.*

Liddy, E.D., Paik, W. and Yu, E.S. "Text Categorization for Multiple Users Based on Semantic Features from a Machine–Readable Dictionary", ACM Transactions on Information Systems, vol. 12, No. 3, Jul. 1994, pp. 278–295.*

Liddy, E.D. and Myaeng, S.H. "DR–LINK: A System Update for TREC–2", Proceedings of the $2^{nd}$ Text REtrieval Conference (TREC–2), 1993, pp. 85–100.*

Coates–Stephens, S. "The Analysis and Acquisition of Proper Names for Robust Text Understanding", Ph. D. thesis, Departme of Computer Science, City University, London, England, Oct. 1992.*

Brin, S. "Extracting Patterns and Relations from the World Wide Web", WebDB Workshop at the $6^{th}$ International Conference on Extending Database Technology, EDBT '98, 1998, 12 pages.*

(List continued on next page.)

Primary Examiner—Jean R. Homere
Assistant Examiner—Luke S Wassum
(74) Attorney, Agent, or Firm—Samuel A. Kassatly

(57) ABSTRACT

An automatic mining system that identifies a set of relevant terms from a large text database of unstructured information, such as the World Wide Web with a high degree of confidence. The automatic mining system includes a software program that enables the discovery of new relationships by association mining and refinement of co-occurrences, using automatic and iterative recognition of new binary relations through phrases that embody related pairs, by applying lexicographic and statistical techniques to classify the relations, and further by applying a minimal amount of domain knowledge of the relevance of the terms and relations. The automatic mining system includes a knowledge module and a statistics module. The knowledge module is comprised of a stemming unit, a synonym check unit, and a domain knowledge check unit. The stemming unit determines if the relation being analyzed shares a common root with a previously mined relation. The synonym check unit identifies the synonyms of the relation, and the domain knowledge check unit considers extrinsic factors for indications that would further clarify the relationship being mined. The statistics module optimizes the confidence level in the relationship.

21 Claims, 5 Drawing Sheets

U.S. PATENT DOCUMENTS 6,212,494 B1 * 4/2001 Boguraev ..................... 704/9
6,236,991 B1 * 5/2001 Frauenhofer et al. .......... 707/6
6,263,335 B1 * 7/2001 Paik et al. ..................... 707/5
6,385,629 B1 * 5/2002 Sundaresan et al. ........ 707/512

OTHER PUBLICATIONS

Brin, S. et al. "Beyond Market Baskets: Generalizing Association Rules to Correlations", Proceedings of the ACM SIGMOD International Conference on Management of Data and Symposium on Principles of Database Systems, 1997, pp. 265–276.*

Martin, P. and Eklund, P. "Languages and Ontologies to Structure and Access Web Knowledge", $10^{th}$ Annual ACM Conference on Hypertext and Hypermedia, Feb. 21–25, 1999.*

Martin, P. "Using the WordNet Concept Catalog and a Relation Hierarchy for Knowledge Acquisition", Proceedings of the $4^{th}$ Peirce Workshop, Aug. 18, 1995.*

R. Larson, "Bibliometrics of the World Wide Web: An Exploratory Analysis of the Intellectual Structure of Cyberspace," the Proceedings of the 1966 American Society for Information Science Annual Meeting, also published as a technical report, School of Information Management and Systems, University of California, Berkeley, 1996, which is published on the Word Wide Web at URL: http://sherlock.sims.berkeley.edu/docs/asis96/asis96.html.

D. Gibson et al., "Inferring Web Communities from Link Topology," Proceedings of the $9^{th}$ ACM. Conference on Hypertext and Hypermedia, Pittsburgh, PA, 1998.

D. Turnbull. "Bibliometrics and the World Wide Web," Technical Report University of Toronto, 1996.

K. McCain, "Mapping Authors in Intellectual Space: A technical Overview," Journal of the American Society for Information Science, 41(6):433–443, 1990.

S. Brin, "Extracting Patterns and Relations from the World Wide Web," WebDB, Valencia, Spain, 1998.

R. Agrawal et al., "Fast Algorithms for Mining Association Rules," Proc. of the 20th Int'l Conference on VLDB, Santiago, Chile, Sep. 1994.

R. Agrawal et al., Mining Association Rules Between Sets of Items in Large Databases, Proceedings of ACM SIGMOD Conference on Management of Data, pp. 207–216, Washington, D.C., May 1993.

S. Chakrabarti et al. "Focused Crawling: A New Approach to Topic–Specific Web Resource Discovery," Proc. of The $8^{th}$ International World Wide Web Conference, Toronto, Canada, May 1999.

B. Huberman et al., "Strong Regularities in Word Wide Web Surfing," Xerox Palo Alto Research Center.

A. Hutchunson, "Metrics on Terms and Clauses," Department of Computer Science, King's College London.

J. Kleinberg, "Authoritative Sources in a Hyperlinked Environment," Proc. of 9th ACM–SIAM Symposium on Discrete Algorithms, May 1997.

R. Srikant et al., "Mining Generalized Association Rules," Proceedings of the $21^{st}$ VLDB Conference, Zurich, Swizerland, 1995.

W. Li et al., "Facilitating comlex Web queries through visual user interfaces and query relaxation," published on the Word Wide Web at URL: http://www.7scu.edu.au/programme/fullpapers/1936/com1936.htm as of Aug. 16, 1999.

G. Piatetsky–Shapiro, "Discovery, Analysis, and Presentation of Strong Rules," pp. 229–248.

R. Miller et al., "SPHINX: A Framework for Creating Personal, Site–specific Web Crawlers," published on the Word Wide Web at URL: http://www.7scu.edu.au/programme/fullpapers/1875/com1875.htm as of Aug. 16, 199.

S. Soderland. "Learning to Extract Text–based Information from the World Wide Web," American Association for Artificial Intelligence (www.aaai.org), pp. 251–254.

G. Plotkin. "A Note Inductive Generalization," pp. 153–163.

R. Feldman et al., "Mining Associations in Text in the Presence of Background Knowledge," Proceedings of the Second International Conference on Knowledge Discovery and Data Mining, Aug. 2–4, 1996, Portland, Oregon.

R. Kumar et al., "Trawling the Web for Emerging Cyber–Communities," published on the Word Wide Web at URL: http://www8.org/w8–papers/4a–search–mining/trawling/trawling.html as of Nov. 13, 1999.

"Acronym Finder", published on the Word Wide Web at URL:http://acronymfinder.com/ as of Sep. 4, 1999.

* cited by examiner

SYSTEM AND METHOD FOR THE AUTOMATIC MINING OF NEW RELATIONSHIPS

CROSS-REFERENCE TO RELATED APPLICATIONS

This application relates to co-pending U.S. patent applications Ser. No. 09/440,625, titled "System and Method for the Automatic Mining of Acronym-expansion Pairs Patterns and Formation Rules", Ser. No. 09/439,379, titled "System and Method for the Automatic Mining of Patterns and Relations", Ser. No. 09/440,203, titled "System and Method the Automatic Construction of Generalization—Specialization Hierarchy of Terms", Ser. No. 09/440,602, titled "System and Method for the Automatic Recognition of Relevant Terms by Mining Link Annotations", and Ser. No. 09/439,758, titled "System and Method for the Automatic Discovery of Relevant Terms from the World Wide Web", all of which are assigned to, and were filed by the same assignee as this application on even date herewith, and are incorporated herein by reference in their entirety.

FIELD OF THE INVENTION

The present invention relates to the field of data mining, and particularly to a software system and associated method for identifying relevant terms from a large text database of unstructured information, such as the World Wide Web (WWW). More specifically, the present invention relates to the automatic and iterative recognition of new binary relations through phrases that embody related pairs, by applying lexicographic and statistical techniques to classify the relations, and further by applying a minimal amount of domain knowledge of the relevance of the terms and relations.

BACKGROUND OF THE INVENTION

The World Wide Web (WWW) is a vast and open communications network where computer users can access available data, digitally encoded documents, books, pictures, and sounds. With the explosive growth and diversity of WWW authors, published information is oftentimes unstructured and widely scattered. Although search engines play an important role in furnishing desired information to the end users, the organization of the information lacks structure and consistency. Web spiders crawl web pages and index them to serve the search engines. As the web spiders visit web pages, they could look for, and learn pieces of information that would otherwise remain undetected.

Current search engines are designed to identify pages with specific phrases and offer limited search capabilities. For example, search engines cannot search for that relate in a particular way, such as books and authors. Bibliometrics involves the study of the world of authorship and citations. It measures the co-citation strength, which is a measure of the similarity between two technical papers on the basis of their common citations. Statistical techniques are used to compute this measures. In typical bibliometric situations the citations and authorship are explicit and do not need to be mined. One of the limitations of the bibliometrics is that it cannot be used to extract buried information in the text.

Exemplary bibliometric studies are reported in: R. Larson, "Bibliometrics of the World Wide Web: An Exploratory Analysis of the Intellectual Structure of Cyberspace," Technical report, School of Information Management and Systems, University of California, Berkeley, 1996. <http://sherlock.sims.berkeley.edu/docs/asis96/asis96.html>; K. McCain, "Mapping Authors in Intellectual Space: A technical Overview," Journal of the American Society for Information Science, 41(6):433–443, 1990. A Dual Iterative Pattern Relation Expansion (DIPRE) method that addresses the problem of extracting (author, book) relationships from the web is described in S. Brin, "Extracting Patterns and Relations from the World Wide Web," WebDB, Valencia, Spain, 1998.

Another area to identify a set of relevant information on the World Wide Web is the Hyperlink-Induced Topic Search (HITS). HITS is a system that identifies authoritative web pages on the basis of the link structure of web pages. It iteratively identifies good hubs, that is pages that point to good authorities, and good authorities, that is pages pointed to by good hub pages. This technique has been extended to identify communities on the web, and to target a web crawler. One of HITS' limitations resides in the link topology of the pattern space, where the hubs and the authorities are of the same kind. i.e., they are all web pages. HITS is not defined in the text of web pages in the form of phrases containing relations in specific patterns.

Exemplary HITS studies are reported in: D. Gibson et al., "Inferring Web Communities from Link Topology," HyperText, pages 225–234, Pittsburgh, Pa., 1998; J. Kleinberg, "Authoritative Sources in a Hyperlinked Environment," Proc. of 9th ACM-SIAM Symposium on Discrete Algorithms, May 1997; R. Kumar, "Trawling the Web for Emerging Cyber-Communities," published on the WWW at URL: <http://www8.org/w8-papers/4a-search-mining/trawling/trawling.html>as of Nov. 13, 1999; and S. Chakrabarti et al. "Focused Crawling: A New Approach to Topic-Specific Web Resource Discovery," Proc. of The 8th International World Wide Web Conference, Toronto, Canada, May 1999.

Furthermore, not only is the quantity of WWW material increasing, but the types of digitized material are also increasing. For example, it is possible to store alphanumeric texts, data, audio recordings, pictures, photographs, drawings, images, video and prints. However, such large quantities of materials is of little value unless it the desired information is readily retrievable. While, as discussed above, certain techniques have been developed for accessing certain types of textual materials, these techniques are at best moderately adequate for accessing graphic, audio or other specialized materials. Consequently, there are large bodies of published materials that remain inaccessible and thus unusable or significantly under utilized.

A common technique for accessing textual materials is by means of a "keyword" combination, generally with boolean connections between the words or terms. This searching technique suffers from several drawbacks. First, the use of this technique is limited to text and is not usable for other types of material. Second, in order to develop a searchable database of terms, the host computer must usually download the entire documents, which is a time-consuming process, and does not normally provide an association between relevant rerms.

Exemplary work in scalable data mining technology, is described in the following references: R. Agrawal et al., "Mining Association Rules Between Sets of Items in Large Databases, Proceedings of ACM SIGMOD Conference on Management of Data, pp. 207–216, Washington, D.C., May 1993; R. Agrawal et al., "Fast Algorithms for Mining Association Rules," Proc. of the 20th Int'l Conference on VLDB, Santiago, Chile, September 1994; and S. Brin, "Extracting Patterns and Relations from the World Wide Web," WebDB, Valencia, Spain, 1998, supra. Such work has been successfully applied to identify co-occurring patterns in many real world problems including market basket analysis, cross-marketing, store layout, and customer segmentation based on buying patterns.

Early work on applying association to texts can be found in FACT system, described in R. Feldman et al., "Mining Associations in Text in the Presence of Background Knowledge," Proceedings of the Second International Conference on Knowledge Discovery and Data Mining, Aug. 2–4, 1996, Portland, Oreg. It discovers associations amongst only keywords representing the topics of the document. The FACT system assumes that a set of predefined keywords describing the document is available. Such an assumption might not be too unrealistic for a set of well annotated documents or for a classes of documents for which text categorization system automatically produces reasonably good annotations with keywords. However, the assumption generally does not hold true for WWW pages since a major portion of the WWW pages is not well annotated. Annotation of the WWW pages by general text categorization techniques can perform poorly, in that these techniques use natural language processing (NLP) that expect grammatically correct sentences, and WWW pages frequently consist of irregular sentences.

There is therefore a great and still unsatisfied need for a software system and associated methods for automatically identifying relevant terms on the World Wide Web. The system and methods should enable the automatic and iterative recognition of binary relations through phrases that embody related pairs, by applying lexicographic and statistical techniques to classify the relations, and further by applying a minimal amount of domain knowledge of the relevance of terms and relations.

SUMMARY OF THE INVENTION

In accordance with the present invention, a computer program product is provided as an automatic mining system to identify a set of related terms from a large text database of unstructured information, such as the World Wide Web (WWW), with a high degree of confidence.

The automatic mining system includes a software program that enables the discovery of new relationships by association mining and refinement of co-occurrences, using automatic and iterative recognition of new binary relations through phrases that embody related pairs, by applying lexicographic and statistical techniques to classify the relations, and further by applying a minimal amount of domain knowledge of the relevance of the terms and relations.

The foregoing and other features and advantages of the present invention can be accomplished by an automatic mining system that includes a database for storing the mined sets of relevant terms and relations, and a software package comprised of a knowledge module and a statistics module. Using the document $d_i$, the previously identified sets of pairs $P_{i-1}$, and relations $R_{i-1}$, the knowledge module inquires whether or not the relation $r_i$ exists in the set of relations $R_{i-1}$. If the relation $r_i$ is deemed not to exist in the set of relations $R_{i-1}$, the knowledge module forwards the pair $p_i$ and the derived relation $r_i$ to the statistics module for optimizing and increasing the confidence level in the relation $r_i$ being considered. The derived relation $r_i$ is stored in the database for recognizing additional pairs $p_{i+1}$, and relations $r_{i+1}$. If the knowledge module determines the relation exists in the set of relations $R_{i-1}$, the knowledge module terminates the mining progress and proceeds to mine additional pairs and relations.

In one embodiment, the knowledge module includes one or more of the following units: a stemming unit, a synonym check unit, and a domain knowledge check unit. The stemming unit determines if the relation $r_i$ being analyzed shares a common root with a previously mined relation $r_{i-1}$ in the database. The synonym check unit identifies the synonyms of the relation $r_i$. The domain knowledge check unit considers the content of the document $d_i$ for indications that would further clarify the relationship of the relations being mined. The statistics module optimizes and increases the confidence level in the relationship on the basis of the previous usage of the relations.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items.

DETAILED DESCRIPTION OF THE INVENTION

Figure 1:
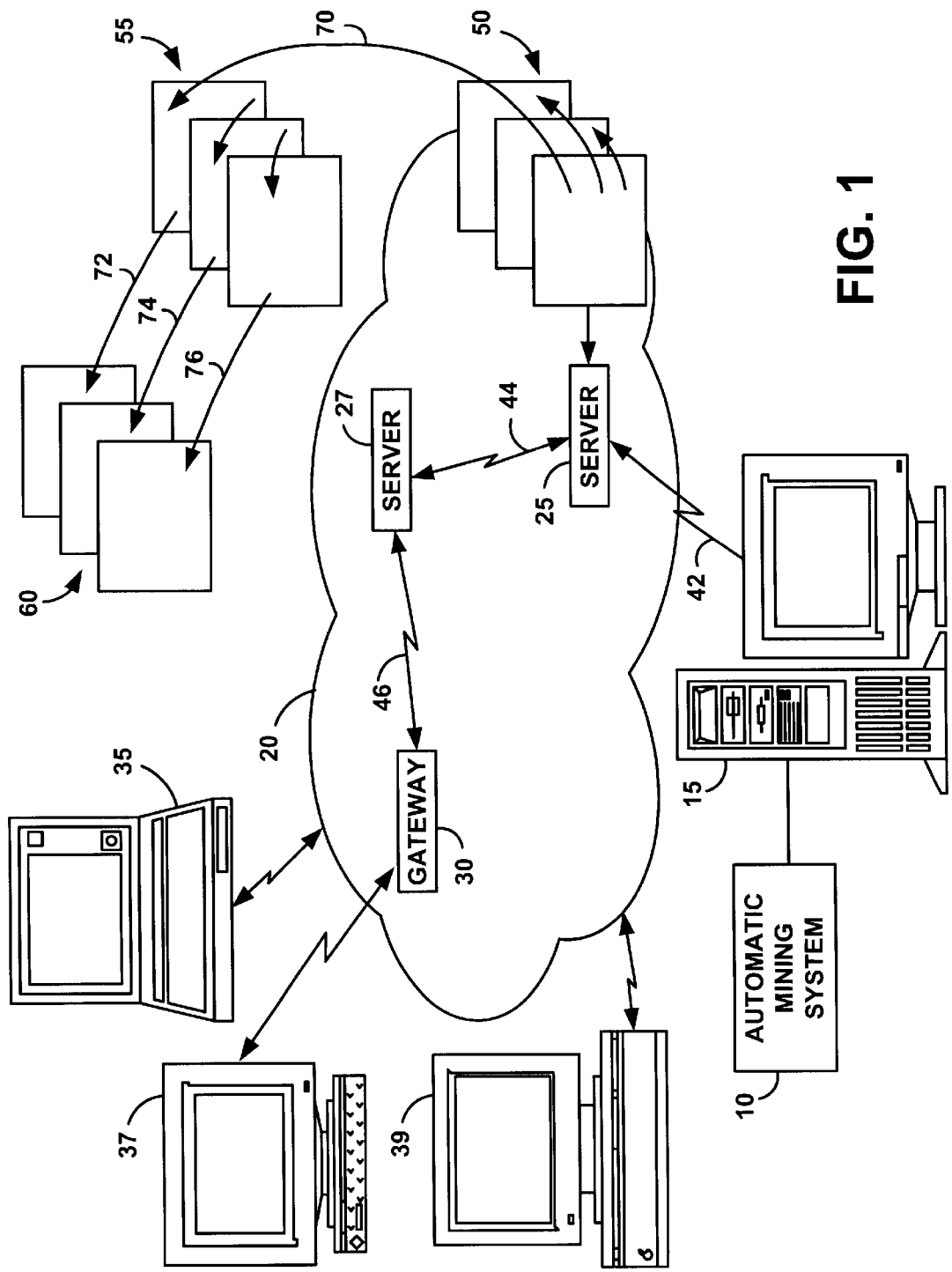
FIG. 1 is a schematic illustration of an exemplary operating environment in which the automatic mining system of the present invention can be used.

The following definitions and explanations provide background information pertaining to the technical field of the present invention, and are intended to facilitate the understanding of the present invention without limiting its scope:

Crawler or spider: A program that automatically explores the World Wide Web by retrieving a document and recursively retrieving some or all the documents that are linked to it.

Gateway: A standard interface that specifies how a web server launches and interacts with external programs (such as a database search engine) in response to requests from clients.

Hypertext System: A computer-based informational system in which documents (and possibly other types of data entities) are linked together via hypertext links to form a user-navigable web.

Hypertext Link (or hyperlink): A reference link from some point in one hypertext document to another point in another document or another place in the same document. When a user activates the link (e.g. by clicking on it with the mouse) the browser will display the destination of the link.

HTML (Hypertext Markup Language): A standard language for attaching presentation and linking attributes to informational content within documents. During a document authoring stage, HTML "tags" are embedded within the informational content of the document. When the web document (or "HTML document") is subsequently transmitted by a web server to a web browser, the tags are interpreted by the browser and used to parse and display the document. In addition to specifying how the web browser is to display the document, HTML tags can be used to create hyperlinks to other web documents.

HTTP (Hypertext Transfer Protocol): Standard WWW client-server protocol used for the exchange of information (such as HTML documents, and client requests for such documents) between a web browser and a web server. HTTP includes several different types of messages that can be sent from the client to the server to request different types of server actions.

Internet: A collection of interconnected public and private computer networks that are linked together with routers by a set of standards protocols to form a global, distributed network.

Metadata (or annotation) of a hyperlink: Description of a hyperlink provided by the page that contains it. Ideally, it describes the concept of the linked page. This description may be found, for example, in elements around a hyperlink's anchor tags. Such elements may include attribute values or free text surrounding the hyperlink. Of these elements, anchor texts seem to be the most descriptive and frequent, and are believed to constitute serious candidates for use as annotations.

Server: A software program or a computer that responds to requests from a web browser by returning ("serving") web documents.

SGML (Standard Generalized Markup Language): A generic markup language for representing documents. SGML is an International Standard that describes the relation between a document's content and its structure. SGML allows document-based information to be shared and re-used across applications and computer platforms in an open, vendor-neutral format. SGML is defined in "ISO 8879:1986 Information processing—Text and office systems—Standard Generalized Markup Language (SGML)", an ISO standard produced by JTC 1/SC 18 and amended by "Amendment 1:1 988".

URL (Uniform Resource Locator): A unique address which fully specifies the location of a content object on the Internet. The general format of a URL is protocol://server-address/path/filename.

XML (Extensible Markup Language): A meta-language that provides a framework (or set of rules) to specify domain specific languages. Sometimes described as a simplified dialect of SGML suitable for use on the Word-Wide Web, it gives rise to such markup languages as SMIL (Synchronized Multimedia Integration Language), CML (Chemical Markup Language), MML (Mathematics Markup Language), etc.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server. It is possible for the server to generate pages dynamically in response to a request from the user. A web page can be in any format that the browser or a helper application can display. The format is transmitted as part of the headers of the response as a MIME type, e.g. "text/htmI", "image/gif". An HTML web page will typically refer to other web pages and Internet resources by including hypertext links.

Web Site: A database or other collection of inter-linked hypertext documents ("web documents" or "web pages") and associated data entities, which is accessible via a computer network, and which forms part of a larger, distributed informational system such as the WWW. In general, a web site corresponds to a particular Internet domain name, and includes the content of a particular organization. Other types of web sites may include, for example, a hypertext database of a corporate "intranet" (i.e., an internal network which uses standard Internet protocols), or a site of a hypertext system that uses document retrieval protocols other than those of the WWW.

World Wide Web (WWW): An Internet client—server hypertext distributed information retrieval system.

FIG. 1 portrays the overall environment in which automatic mining system 10 according to the present invention can be used. The automatic mining system 10 includes a software or computer program product which is typically embedded within, or installed on a host server 15. Alternatively, the automatic mining system 10 can be saved on a suitable storage medium such as a diskette, a CD, a hard drive, or like devices. The cloud-like communication network 20 is comprised of communication lines and switches connecting servers such as servers 25, 27, to gateways such as gateway 30. The servers 25, 27 and the gateway 30 provide the communication access to the WWW Internet. Users, such as remote internet users are represented by a variety of computers such as computers 35, 37, 39, and can query the automatic mining system 10 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, 60. The hypertext documents 50, 55, 60 most likely include embedded hypertext links to other locally stored pages, and hypertext links 70, 72, 74, 76 to other webs sites or documents 55, 60 that are stored by various web servers such as the server 27.

The automatic mining system 10 will now be described with further reference to FIG. 2. The automatic mining system 10 includes a computer program product such as a software package, which is generally comprised of a relations database 80, a knowledge module 90, and a statistics module 100, and a relationship database 130. In an alternative design, the relations database 80 and/or the relationship database 130 do not form part of the automatic mining system 10.

The relations database 80 stores the sets of previously identified inter-related $P_{i-1}$ and relations $R_{i-1}$, and the relationship database 130 stores the relationships that are mined by the automatic mining system 10. Initially, the relations database 80 begins with small seed sets of pairs $P_0$ and relations $R_0$ that are continuously and iteratively broadened by the automatic mining system 10, as it will be explained in greater detail.

Having described the main components of the automatic mining system 10, its operation will now be described with further reference to FIGS. 3, 4 and 5. As used herein, a "relation" $r_i$ is defined as the phrase that connects the components or terms in the pair, a "pair" $p_i$ is comprised of two inter-related terms, such as concepts, items, persons and similar entities, and a "relationship" is the category or classification of the relations.

Figure 5:
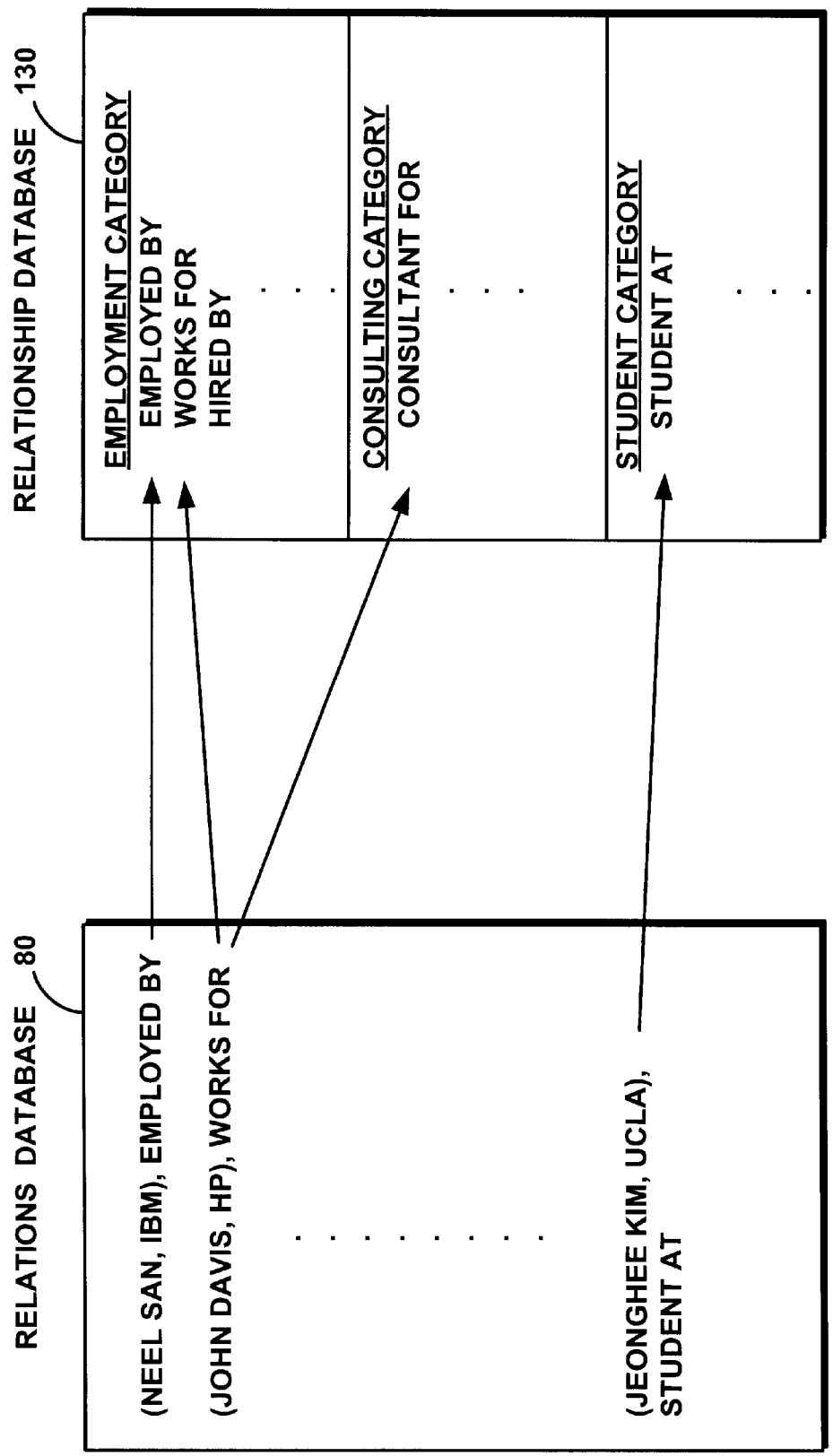
FIG. 5 is an illustration of two exemplary databases: a relations database and a relationship database, forming part of the automatic mining system of FIG. 2.

With reference to FIG. 5, the first relation $r_0$ corresponds to the initial seed pair $p_0$ comprised of an employee (Neel San) and an employer (IBM). In this illustration, the seed relation $r_0$ for the seed pair $p_0$ is that of an employee-employer, and is expressed by the phrase "employed by". The seed relation $r_0$ is categorized and stored in the relationship database 130 under the "Employment Relationship". Another seed pair $p_1$ is comprised of an employee (John Davis) and an employer (HP), with the relation $r_1$ expressed by the phrase "works for" and stored under the "Employment Relationship". Yet another seed pair $p_2$ is comprised of a student (Jeonghee Kim) and a school (UCLA), with the relation $r_2$ expressed by the phrase "student at" and stored under the "Student Relationship".

The automatic mining system 10 provides the added flexibility of allowing a pair $p_i$ to be associated with one or more relations $r_i$ and classified under one or more relationships. As an illustration, the pair (John Davis, HP) is associated with the relations "works for" and "consultant for", and is classified under the "Employment Relationship" and the "Consulting Relationship", respectively.

Figure 2:
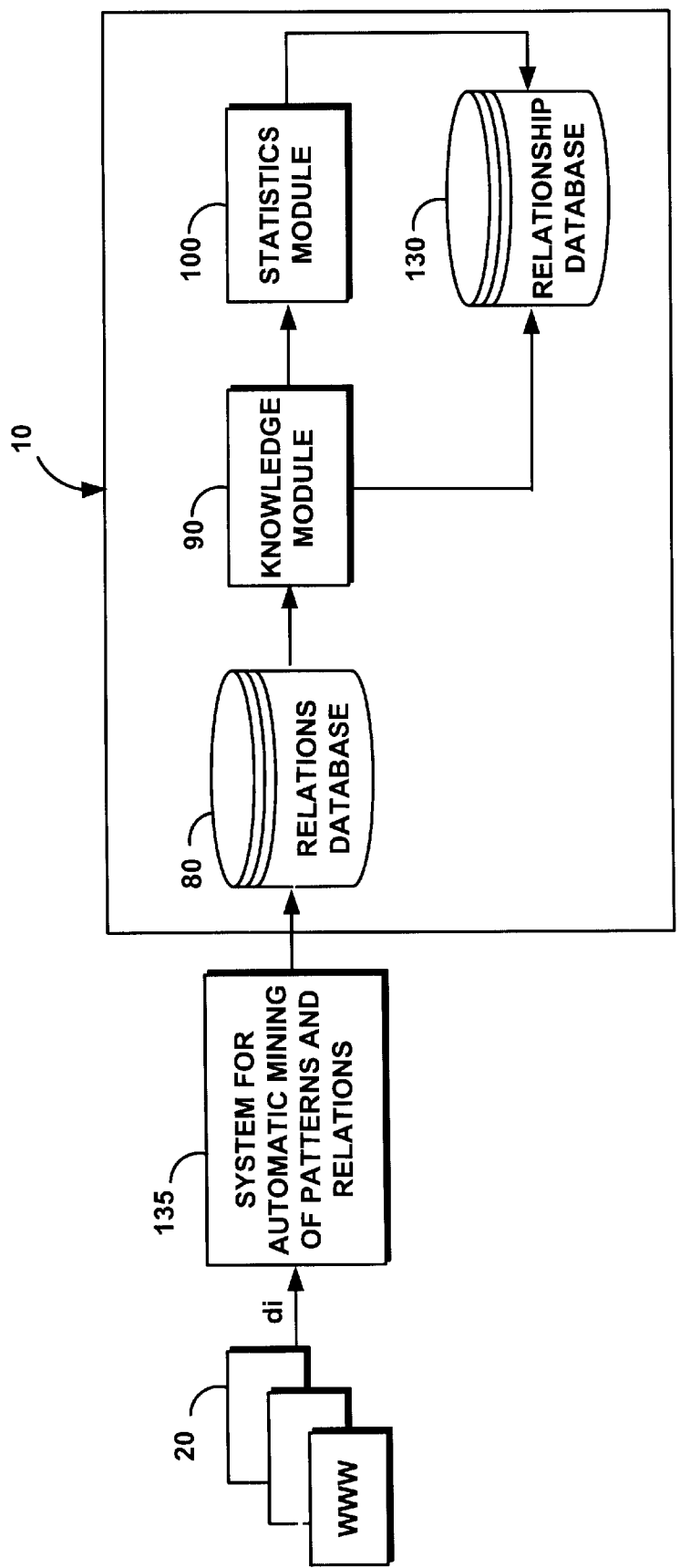
FIG. 2 is a high level diagram of the automatic mining system of FIG. 1.

In the exemplary embodiment illustrated in FIG. 2, a crawler that resides in the host server 15, visits and downloads every page on the Www at periodic intervals, for example about once a month. During a visit to a web page or document $d_i$, the crawler downloads the document content to the host server 15. The host server 15 forwards the document $d_i$ to a system for the automatic mining of patterns and relations 135, which is described for example in the patent application Ser. No. 09/439,379, titled "System and Method for Automatic Mining of Patterns and Relations". The system 135 derives the relations $r_i$ from the document $d_i$, and stores the terms or pairs $p_i$ and the corresponding relations $r_i$ in the relations database 80 within the sets of pairs $P_{i-1}$ and relations $R_{i-1}$, respectively.

Using the sets of pairs $P_{i-1}$ and relations $R_{i-1}$ stored in the relations database 80, the knowledge module 90 inquires whether or not the relation $r_i$ has been previously categorized under an existing relationship, records the decision in the relationship database 130, and does not consider the relation $r_i$ any further. If the knowledge module 90 determines that the relation $r_i$ has not been categorized, it forwards the pair $p_i$ and the new relation $r_i$ to the statistics module 100 for an additional possibility of categorizing the pair $p_i$ and the relation $r_i$ on the basis of previous statistics. If the statistics module 100 cannot associate the relation $r_i$ with an existing relationship, it creates a new relationship for $r_i$. The derived relationships are stored in the relationship database 130.

Figure 3:
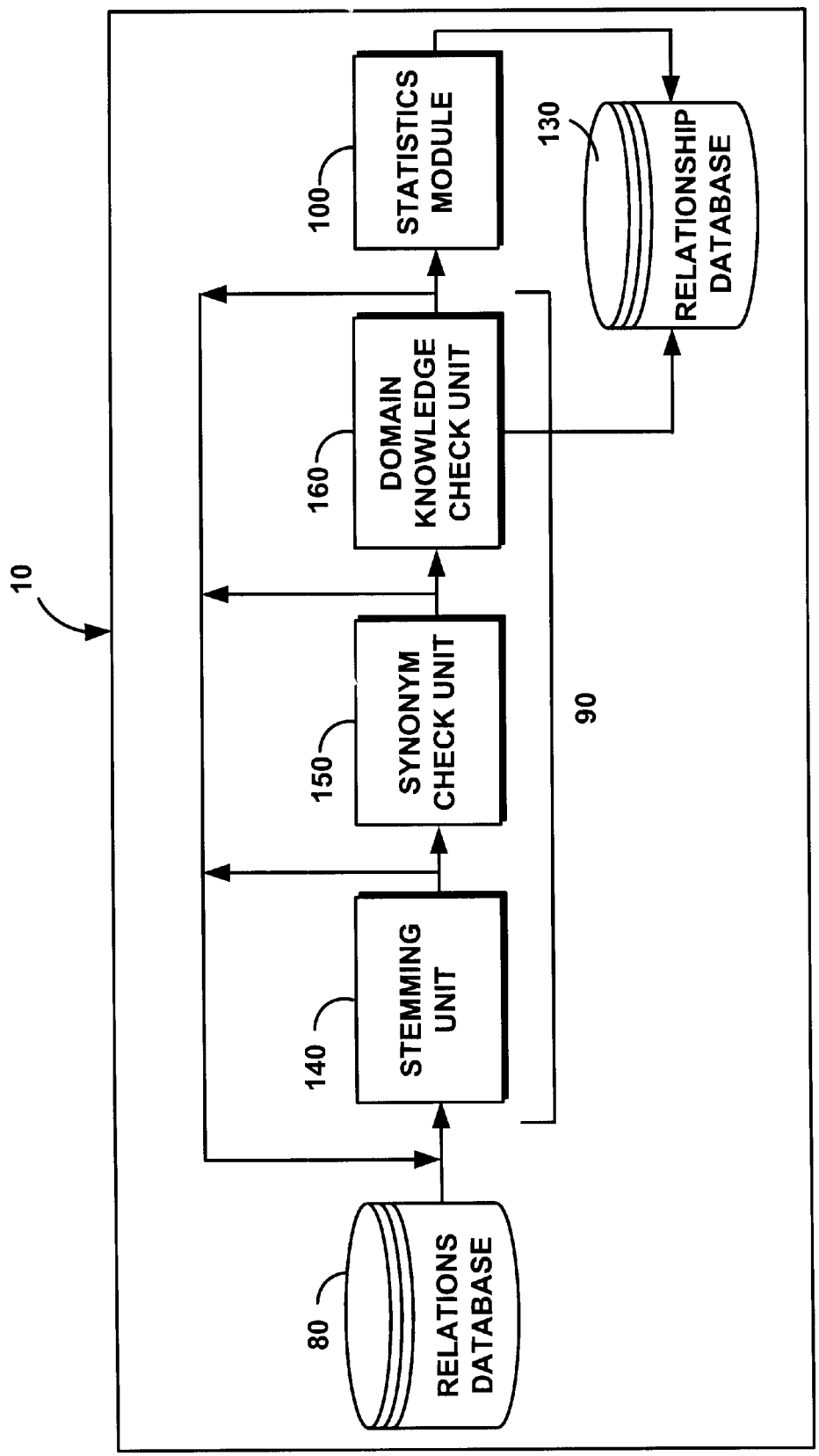
FIG. 3 is a more detailed diagram of the automatic mining system of FIG. 2.

With further reference to FIG. 3, the knowledge module 90 may include one or more of the following units: a stemming unit 140, a synonym check unit 150, and a domain knowledge check unit 160. It should be clear that the processing order of the information is not limited to the example described herein, and that the knowledge module 90 can process the information in any desired order.

The stemming unit 140 determines if the relation $r_i$ shares a common root with a relation $r_{i-1}$ stored in the relations database 80. For example, the stemming unit 140 removes common suffixes such as "s", "ing", or "ed", that indicate plurality, conjugation, or verb tense, respectively, and retains only the root of the term. The content terms after stemming is used to determine the relation. As an illustration, the terms "employee", "employer", "employing", and "employed" all share the common root "employ", and are converted to such common root after stemming and are classified under the "Employment Category" (FIG. 5). The stemming unit 140 can be any of the available applications. One such application is available on the WWW at URL: <http://www.cogsci.princeton.edu/~wn/>.

The synonym check unit 150 identifies the synonyms of the relation $r_i$ being analyzed. The synonym check unit 150 can incorporate or use, one or more applications such as WordNet which is available on the WWW at the following URL: <http://www.cogsci.princeton.edu/~wn/>, or Webster which is available on the WWW at the following URL: <http://work.ucsd.edu:5141/cgi_bin/http_webster>, English Thesaurus such as Wordsmyth English Dictionary-Thesaurus, or NASA Thesaurus which is available on the WWW at the following URL:<http://www.sti.nasa.gov/thesfrm1.htm>. Each relation is classified under the same relationship category or categories as its synonyms. For example, "works for" is a synonym of "employed by", and both terms are classified under the "Employment Relationship" (FIG. 5).

The domain knowledge check unit 160 applies domain knowledge to minimize ambiguity in the relations. For example, certain relations can be categorized under several relationships. As an illustration, the term "by" can mean authorship as in "a book 'by' author", or locational proximity as in "a house 'by' the lake". The domain knowledge check unit 160 applies domain knowledge to these phrases to add clarity and distinctiveness to the relation $r_i$ of the pair $p_i$. If the second term (B) in the pair $p_i$ (A, B) is a person's name, the relation $r_i$ is classified under the "Author Relationship", while if the term (B) identifies a location, such as lake, mountain, street, etc., the relation $r_i$ is classified under the "Geographical Relationship".

If the knowledge module 90 determines that the relation $r_i$ has already been categorized under an existing relationship, the knowledge module 90 records the finding in the relationship database 130. In other terms, the knowledge module 90 considers the content of the document $d_i$ for any indications that would further clarify the relationship being mined.

The statistics module 100 renders statistical judgment of the relation $r_i$ on the basis of the frequency of occurrence of the relation $r_i$ in the document $d_i$. As an example, for the phrase "A by B", with no other domain knowledge in the document $d_i$, the relation $r_i$ is classified with the highest frequency of occurrence. If the most frequent use or meaning of the term "by" is or relates to an authorship relationship, the relation $r_i$ will be classified under the "Authorship Relationship". The relation $r_i$ will be categorized and stored in the database 130 under one or more relationship categories by the statistics module 100.

Figure 4:
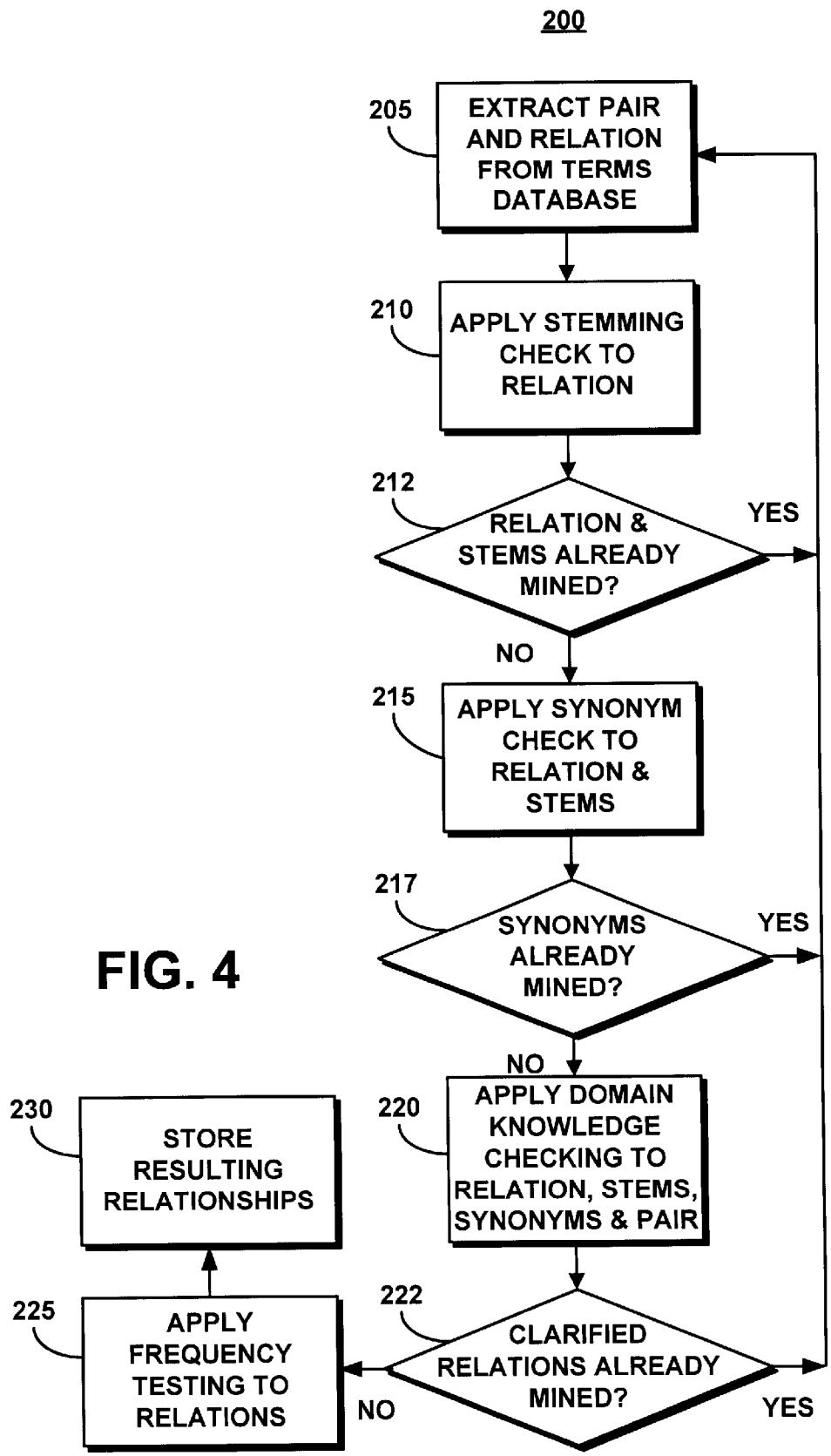
FIG. 4 is a flow chart that illustrates the operation of a preferred embodiment of the automatic mining system of FIG. 3.

The operation of the automatic mining system 10 is represented in FIG. 4 by a process 200. The process 200 starts with the seed pairs $P_{i-1}$, and relations $R_{i-1}$. At step or block 205, the automatic mining system 10 extracts the pair $p_i$ and its associated relation $r_i$ to be analyzed from the relations database 80, and inputs the same to the stemming unit 140. At step 210, the stemming unit 140 applies the stemming check to the new relation $r_i$, and proceeds to the decision block 212.

At step 212, the process 200 inquires whether or not the relation $r_i$ and its stem (or stems) have already been categorized under the existing relationships in the database 130. If the process 200 determines that the relation $r_i$ and its stems have been categorized, it records the finding in the relationship database 130 if the relation $r_i$ is new, and terminates the mining progress and returns to block 205 where it extracts another pair $p_{i+1}$ and relation $r_{i+1}$. If however, the process 200 determines that at least one of the relation $r_i$ or its stems has not been categorized, it proceeds to step 215 where the synonym check unit 150 applies the synonym check to the non-categorized stem of the relation $r_i$, and proceeds to decision block 217.

At step or block 217, the process 200 inquires whether or not the synonym or synonyms of the stem have already been categorized under existing relationships in the database 130. If the process 200 determines that these synonyms have been categorized, it records the finding in the relationship database 130 if the relation $r_i$ is new, and terminates the mining progress and returns to block 205 where it extracts another pair $p_{i+1}$ and relation $r_{i+1}$. If however, the process 200 determines that at least one of the relation $r_i$, its terms and synonyms has not been categorized, it proceeds to step 220.

At step 220, the domain knowledge check unit 160 applies domain knowledge checking to the non-categorized relation $r_i$, stems, and/or synonyms, and, if needed, generates one or more clarified relations therefrom. The non-categorized relation $r_i$, stems, and/or synonyms, and the clarified relations, if any, will be collectively referred to herein as "clarified relations". The process 200 then proceeds to the decision block 222 where it inquires whether or not these clarified relations have already been categorized under existing relationships in the database 130. If the process 200 determines that these clarified relations have been categorized, it terminates the mining progress and returns to block 205 where it extracts another pair $p_{i+1}$ and relation $r_{i+1}$. If the process 200 determines that the clarified relations form a new instance (or case) of an existing relationship, the domain knowledge check unit 160 records the finding in the relationship database 130.

If the process 200 determines that at least one of the clarified relations has not been categorized, it proceeds to step 225 where the statistics module 100 applies the frequency test to the non-categorized clarified relations, and proceeds to block 230. At block 230, the statistics module 100 stores the non-categorized clarified relations in the relationship database 130 for future use.

It is to be understood that the specific embodiments of the invention that have been described are merely illustrative of certain application of the principles of the present invention. Numerous modifications may be made to automatic mining system and associated methods described herein without departing from the spirit and scope of the present invention. Moreover, while the present invention is described for illustration purpose only in relation to the WWW, it should be clear that the invention is applicable as well to databases and other tables with indexed entries.

What is claimed is:

1. A system of automatically mining a new relationship for an extracted pair $p_i$ and a relation $r_i$ within a document $d_i$, comprising:

a relations database for storing previously identified sets of pairs $P_{i-1}$ and relations $R_{i-1}$;

a relations database for storing previously identified sets of pairs $P_{i-1}$ and relations $R_{i-1}$;

a relationship database for storing the relation $r_i$ under a corresponding relationship category;

wherein if there is no relationship category corresponding to the relation $r_i$ in the relationship database, a knowledge module receives the extracted pair $p_i$ and the relation $r_i$ and applies a linguistic technique to classify the relation $r_i$;

wherein if the linguistic technique fails to identify a corresponding relationship category in the relationship database, a statistics module receives the relation $r_i$ and applies a statistical technique to classify the relation $r_i$; and wherein if the statistical technique fails to identity a corresponding relationship category in the relationship database, defining a new relationship category and storing the relation $r_i$ under the new relationship category in the relationship database.

2. The system according to claim 1, wherein the knowledge module includes a stemming unit that determines if the relation $r_i$ shares a common root with a previously mined relation $r_{i-1}$ in the relations database.

3. The system according to claim 2, wherein the knowledge module includes a synonym check unit that identifies one or more synonyms of the relation $r_i$.

4. The system according to claim 2, wherein the knowledge module includes a domain knowledge check unit that considers one or more extrinsic indications to clarify the new relationship.

5. The system according to claim 1, wherein the knowledge module includes:

a stemming unit that determines if the relation $r_i$ shares a common root with a previously mined relation $r_{i-1}$ in the database;

a synonym check unit that identifies one or more synonyms of the relation $r_i$;

a domain knowledge check unit that considers one or more extrinsic indications to clarify the new relationship.

6. The system according to claim 1, wherein the knowledge module includes a stemming unit that determines if the relation $r_i$ shares a common root with a previously mined relation $r_{i-1}$ in the database, and removes common suffixes, if any.

7. The system according to claim 1, wherein the linguistic technique comprises stemming.

8. The system according to claim 7, wherein the linguistic technique further comprises synonym checking.

9. The system according to claim 1, wherein the knowledge module further applies domain knowledge to classify the relation $r_i$.

10. A computer program product of automatically mining a new relationship for an extracted pair $p_i$ and a relation $r_i$ within a document $d_i$, comprising:

a relations database for storing previously identified sets of pairs $P_{i-1}$ and relations $R_{i-1}$;

a relations database for storing previously identified sets of pairs $P_{i-1}$ and relations $R_{i-1}$;

a relationship database for storing the relation $r_i$ under a corresponding relationship category;

wherein if there is no relationship category corresponding to the relation $r_i$ in the relationship database, a knowledge module receives the extracted pair $p_i$ and the relation $r_i$ and applies a linguistic technique to classify the relation $r_i$;

wherein if the linguistic technique fails to identify a corresponding relationship category in the relationship database, a statistics module receives the relation $r_i$ and applies a statistical technique to classify the relation $r_i$; and wherein if the statistical technique fails to identify a corresponding relationship category in the relationship database, defining a new relationship category and storing the relation $r_i$ under the new relationship category in the relationship database.

11. The computer program product according to claim 10, wherein the knowledge module includes a stemming unit that determines if the relation $r_i$ shares a common root with a previously mined relation $r_{i-1}$ in the relations database.

12. The computer program product according to claim 11, wherein the knowledge module includes a synonym check unit that identifies one or more synonyms of the relation $r_i$.

13. The computer program product according to claim 11, wherein the knowledge module includes a domain knowledge check unit that considers one or more extrinsic indications to clarify the new relationship.

14. The computer program product according to claim 10, wherein the knowledge module includes:
- a stemming unit that determines if the relation $r_i$ shares a common root with a previously mined relation $r_{i-1}$ in the database;
- a synonym check unit that identifies one or more synonyms of the relation $r_i$;
- a domain knowledge check unit that considers one or more extrinsic indications to clarify the new relationship.

15. The computer program product according to claim 10, wherein the knowledge module includes a stemming unit that determines if the relation $r_i$ shares a common root with a previously mined relation $r_{i-1}$ in the database, and removes common suffixes, if any.

16. A method of automatically mining a new relationship for an extracted pair $p_i$ and a relation $r_i$ within a document $d_i$, comprising:
- a relations database storing previously identified sets of pairs $P_{i-1}$ and relations $R_{i-1}$;
- a relationship database storing the relation $r_i$ under a corresponding relationship category;
- wherein if there is no relationship category corresponding to the relation $r_i$ in the relationship database, a knowledge module receiving the extracted pair $p_i$ and the relation $r_i$ and applying a linguistic technique to classify the relation $r_i$;
- wherein if the linguistic technique fails to identify a corresponding relationship category in the relationship database, a statistics module receiving the relation $r_i$ and applies a statistical technique to classify the relation $r_i$; and
- wherein if the statistical technique fails to identify a corresponding relationship category in the relationship database, defining a new relationship category and storing the relation $r_i$ under the new relationship category in the relationship database.

17. The method according to claim 16, further including determining if the relation $r_i$ shares a common root with a previously mined relation $r_{i-1}$ in the relations database.

18. The method according to claim 17, further including identifying one or more synonyms of the relation $r_i$.

19. The method according to claim 17, further including considering one or more extrinsic indications to clarify the new relationship.

20. The method according to claim 16, further including:
- determining if the relation $r_i$ shares a common root with a previously mined relation $r_{i-1}$ in the relations database;
- identifying one or more synonyms of the relation $r_i$; and
- considering one or more extrinsic indications to clarify the new relationship.

21. The method according to claim 16, further including determining if the relation $r_i$ shares a common root with a previously mined relation $r_{i-1}$ in the database, and removing common suffixes, if any.

* * * * *